US007975267B2

(12) United States Patent
Bennett et al.

(10) Patent No.: US 7,975,267 B2
(45) Date of Patent: *Jul. 5, 2011

(54) VIRTUAL INTERRUPT PROCESSING IN A LAYERED VIRTUALIZATION ARCHITECTURE

(76) Inventors: Steven M. Bennett, Hillsboro, OR (US); Andrew V. Anderson, Hillsboro, OR (US); Gilbert Neiger, Portland, OR (US); Dion Rodgers, Hillsboro, OR (US); Richard A. Uhlig, Hillsboro, OR (US); Lawrence O. Smith, Beaverton, OR (US); Barry E. Huntley, Hillsboro, OR (US)

(*) Notice: Subject to any disclaimer, the term of this patent is extended or adjusted under 35 U.S.C. 154(b) by 906 days.

This patent is subject to a terminal disclaimer.

(21) Appl. No.: 11/694,236

(22) Filed: Mar. 30, 2007

(65) Prior Publication Data

US 2008/0244571 A1    Oct. 2, 2008

(51) Int. Cl.
*G06F 9/455* (2006.01)
*G06F 9/46* (2006.01)
*G06F 13/24* (2006.01)

(52) U.S. Cl. ............... 718/1; 718/100; 710/260

(58) Field of Classification Search ............... 718/1, 100
See application file for complete search history.

(56) References Cited

U.S. PATENT DOCUMENTS

| 2004/0123288 A1* | 6/2004 | Bennett et al. ............ 718/1 |
| 2007/0028238 A1* | 2/2007 | Bennett et al. ............ 718/1 |
| 2007/0050764 A1* | 3/2007 | Traut .................... 718/1 |

* cited by examiner

*Primary Examiner* — Kenneth Tang
(74) *Attorney, Agent, or Firm* — Thomas R. Lane

(57) ABSTRACT

Embodiments of apparatuses, methods, and systems for processing virtual interrupts in a layered virtualization architecture are disclosed. In one embodiment, an apparatus includes virtual machine entry logic, recognition logic, and evaluation logic. The virtual machine entry logic is to transfer control of the apparatus from a host to a guest. The recognition logic is to recognize a virtual interrupt request. The evaluation logic is to determine whether to transfer control from the guest to an intervening monitor in response to the virtual interrupt request.

14 Claims, 3 Drawing Sheets

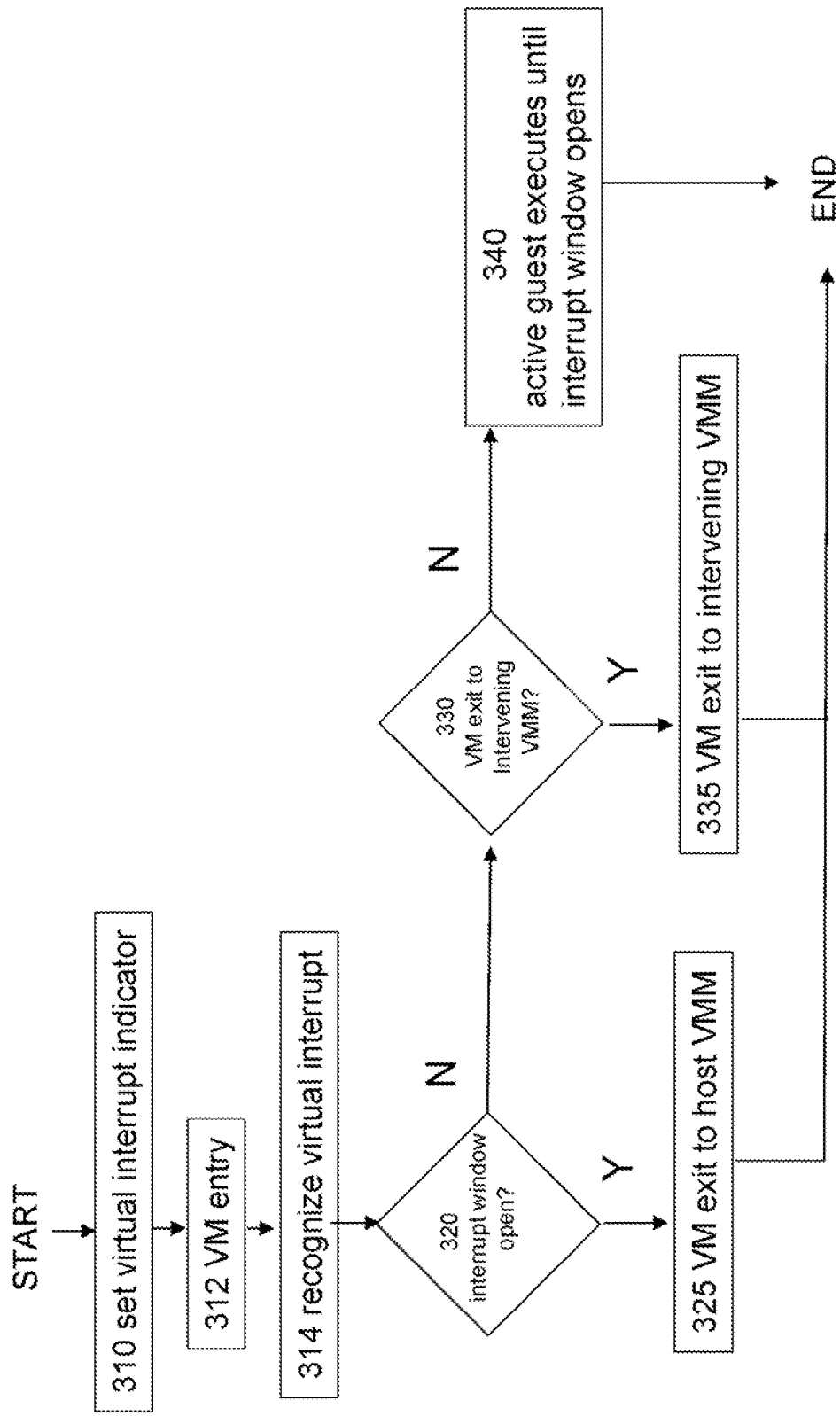

VIRTUAL INTERRUPT PROCESSING IN A LAYERED VIRTUALIZATION ARCHITECTURE

BACKGROUND

1. Field

The present disclosure pertains to the field of data processing, and more particularly, to the field of virtualizing resources in data processing apparatuses.

2. Description of Related Art

Generally, the concept of virtualization of resources in data processing apparatuses allows multiple instances of one or more operating systems (each, an "OS") to run on a single data processing apparatus, even though each OS is designed to have complete, direct control over the apparatus and its resources. Virtualization is typically implemented by using software (e.g., a virtual machine monitor, or a "VMM") to present to each OS a "virtual machine" (a "VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM, unaware of the virtualization environment, is referred to as a "guest" or as "guest software," while a "host" or "host software" is software, such as a VMM, that runs outside of the virtualization environment.

A processor in a data processing apparatus may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be intercepted, i.e., cause the processor to exit the virtualization environment so that the VMM may operate, for example, to implement virtualization policies. The processor may support instructions for establishing, entering, exiting, and maintaining a virtualization environment, and may include register bits or other structures that indicate or control virtualization capabilities of the processor.

BRIEF DESCRIPTION OF THE FIGURES

The present invention is illustrated by way of example and not limitation in the accompanying figures.

FIG. 3 illustrates a method for processing virtual interrupts according to an embodiment of the present invention.

DETAILED DESCRIPTION

Embodiments of apparatuses and methods for processing virtual interrupts in a layered virtualization environment are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Figure 1:
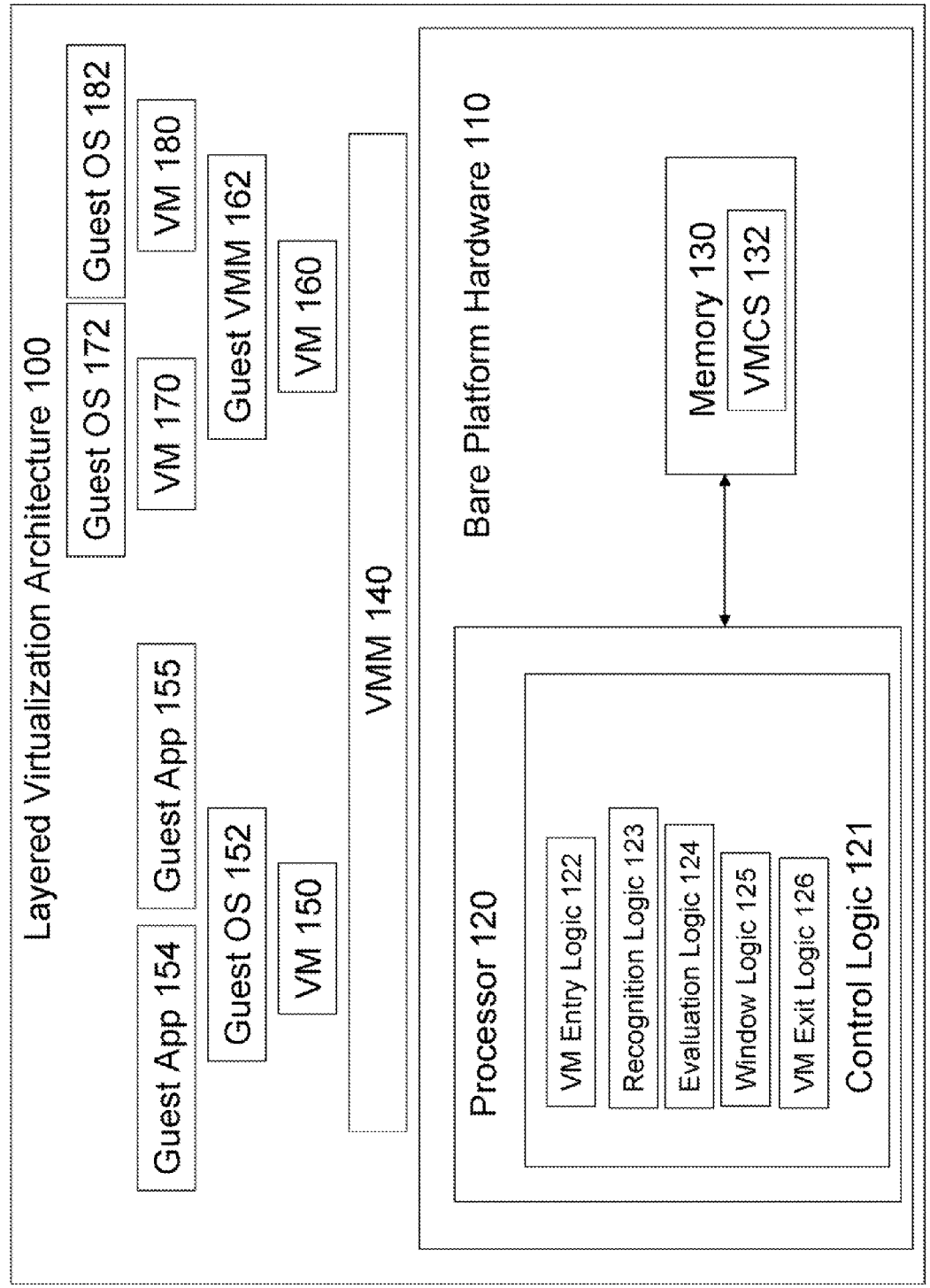
FIG. 1 illustrates a layered virtualization architecture in which an embodiment of the present invention may operate.

FIG. 1 illustrates layered virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, server, portable computer, handheld device, set-top box, or any other computing system. Bare platform hardware 110 includes processor 120, memory 130, input/output ("I/O") device 111, and chipset 112.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors. Processor 120 may include multiple threads or multiple cores in any combination.

Memory 130 may be static or dynamic random access memory, semiconductor-based read only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150, 160, 170, and 180, and a number of guests.

VMM 140 may be any software, firmware, or hardware host installed to run on, or accessible to, bare platform hardware 110, to present VMs, i.e., abstractions of bare platform hardware 110, to guests, or to otherwise create VMs, manage VMs, and implement virtualization policies within a virtualization environment supported by virtualization architecture 100. In this embodiment, VMM 140 is a "root mode host" because it runs in root mode on processor 120. In other embodiments, a root mode host may be any monitor, hypervisor, OS, or other software, firmware, or hardware capable of controlling bare platform hardware 110.

A guest may be any OS, any VMM, including another instance of VMM 140, any hypervisor, or any application or other software. Each guest expects to access physical resources, such as processor and platform registers, memory, and I/O devices, of bare platform hardware 110, according to the architecture of the processor and the platform presented in the VM. FIG. 1 shows VMs 150, 160, 170, and 180, with guest OS 152 and guest applications 154 and 155 installed to run on VM 150, guest VMM 162 installed to run on VM 160, guest OS 172 installed to run on VM 170, and guest OS 182 installed to run on VM 180. In this embodiment, all guests run in non-root mode. Although FIG. 1 shows four VMs, four guest OSs and six guest applications, any number of VMs may be created and any number of guest OSs and applications may be installed to run on each VM within the scope of the present invention.

Virtualization architecture 100 is "layered" or "recursive" because it allows one VMM, for example, VMM 140, to host another VMM, for example, VMM 162, as a guest. In layered virtualization architecture 100, VMM 140 is the host of the virtualization environment including VMs 150 and 160, and is not a guest in any virtualization environment because it is installed to run on bare platform hardware 110 with no "intervening" monitor between it and bare platform hardware 110. An "intervening" monitor is a monitor, such as VMM 162, that hosts a guest, such as guest OS 172, but is also a guest itself. VMM 162 is the host of the virtualization environment including VMs 170 and 180, but is also a guest in the virtualization environment hosted by VMM 140. An intervening monitor (e.g., VMM 162) is referred to herein as a parent guest, because it may function as both a parent to another VM (or hierarchy of VMs) and as a guest of an underlying VMM (e.g., VMM 140 is a parent of VMM 162 which is a parent to guests 172 and 182).

A monitor, such as VMM 140, is referred to as the "parent" of a guest, such as OS 152, guest application 154, guest application 155, and guest VMM 162, if there are no intervening monitors between it and the guest. The guest is referred to as the "child" of that monitor. A guest may be both a child and a parent. For example, guest VMM 162 is a child of VMM 140 and the parent of guest OS 172 and guest OS 182.

A resource that can be accessed by a guest may either be classified as a "privileged" or a "non-privileged" resource. For a privileged resource, a host (e.g., VMM 140) facilitates the functionality desired by the guest while retaining ultimate control over the resource. Non-privileged resources do not need to be controlled by the host and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by a host to ensure proper operation of VMs, protection of the host from guests, and protection of guests from each other.

At any given time, processor 120 may be executing instructions from VMM 140 or any guest, thus VMM 140 or the guest may be active and running on, or in control of, processor 120. When a privileged event occurs or a guest attempts to access a privileged resource, control may be transferred from the guest to VMM 140. The transfer of control from a guest to a host is referred to as a "VM exit" herein. After handling the event or facilitating the access to the resource appropriately, VMM 140 may return control to a guest. The transfer of control from a host to a guest is referred to as a "VM entry" herein.

In addition to a VM exit transferring control from a guest to a root mode host, as described above, embodiments of the present invention also provide for a VM exit to transfer control from a guest to a non-root mode host, such as an intervening monitor.

In the embodiment of FIG. 1, processor 120 controls the operation of VMs according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. VMCS 132 may be divided into multiple structures, each corresponding to one host or one guest, where each may be considered an independent VMCS.

The "guest hierarchy" of a VMM is the stack of software installed to run within the virtualization environment or environments supported by the VMM. The present invention may be embodied in a virtualization architecture in which guest hierarchies include chains of pointers between VMCSs. These pointers are referred to as "parent pointers" when pointing from the VMCS of a child to the VMCS of a parent, and as "child pointers" when pointing from the VMCS of a parent to the VMCS of a child. In the guest hierarchy of a VMM, there may be one or more intervening monitors between the VMM and the active guest. An intervening monitor that is closer to the VMM whose guest hierarchy is being considered is referred to as "lower" than an intervening monitor that is relatively closer to the active guest.

Figure 2:
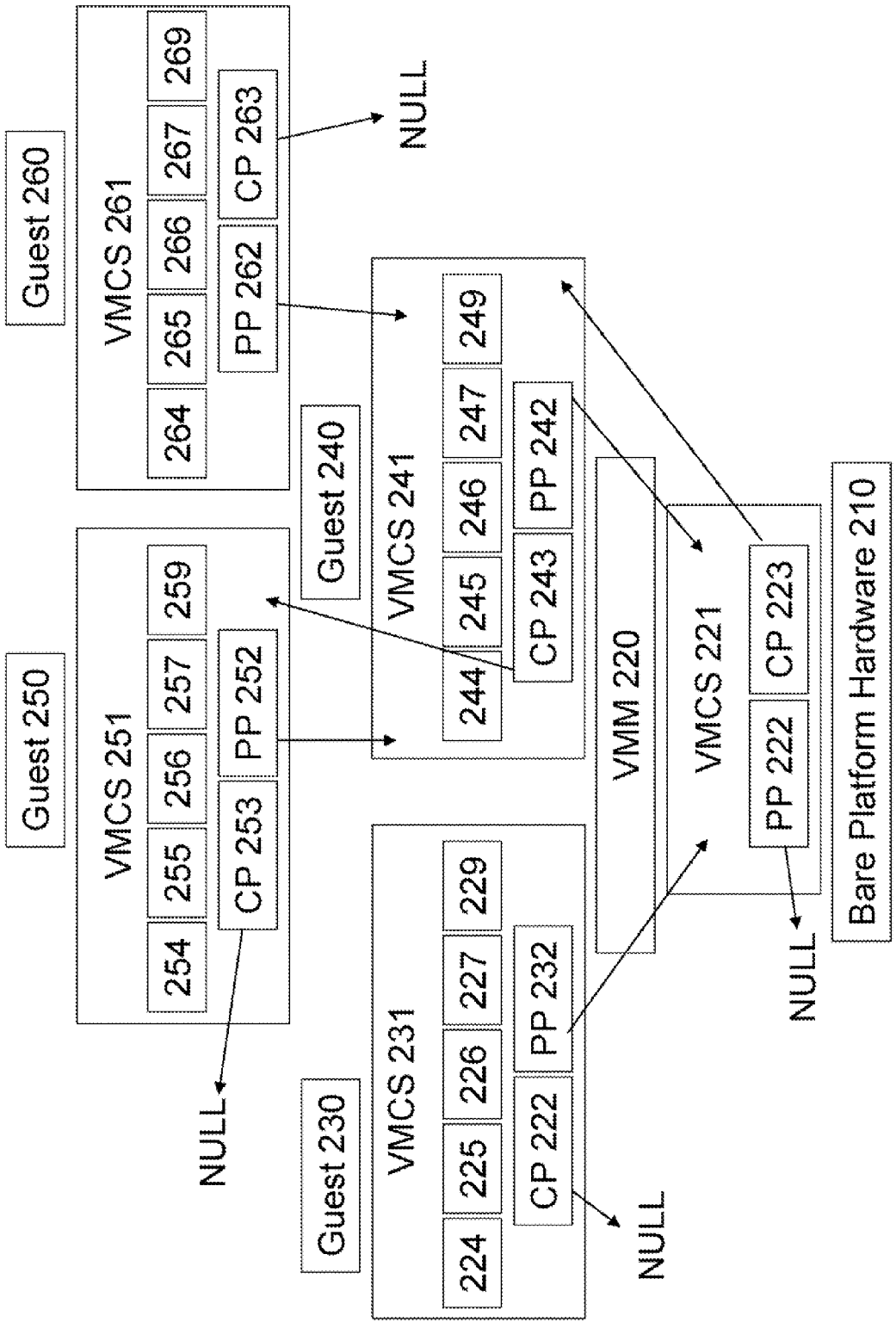
FIG. 2 illustrates the guest hierarchy of a VMM in a layered virtualization architecture.

FIG. 2 illustrates the guest hierarchy of VMM 220, which is installed as a root mode host on bare platform hardware 210. VMCS 221 is a control structure for VMM 220, although a root mode host may operate without a control structure. Guest 230 is a child of VMM 220, controlled by VMCS 231. Therefore, parent, pointer ("PP") 232 points to VMCS 221. Guest 240 is also a child of VMM 220, controlled by VMCS 241. Therefore, parent pointer 242 also points to VMCS 221.

Guest 240 is itself a VMM, with two children, guests 250 and 260, each with a VMCS, 251 and 262, respectively. Both parent pointer 252 and parent pointer 262 point to VMCS 241.

The VMCS of a guest that is active, or running, is pointed to by the child pointer of its parent's VMCS. Therefore, FIG. 2 shows child pointer 243 pointing to VMCS 251 to indicate that guest 250 is active. Similarly, the VMCS of a guest with an active child pointer, as opposed to a null child pointer, is pointed to by the child pointer of its parent's VMCS. Therefore, FIG. 2 shows child pointer 223 pointing to VMCS 241. Consequently, a chain of parent pointers links the VMCS of an active guest through the VMCSs of any intervening monitors to the VMCS of a root mode host, and a chain of child pointers links the VMCS of a root mode host through the VMCSs of any intervening monitors to the VMCS of an active guest.

The VMCS 221 is referred to herein as the "root VMCS". In an embodiment, there is no root VMCS, as described above. In an embodiment which includes a root VMCS, the processing hardware may maintain a pointer to the root VMCS in an internal register or other data structure. The VMCS of a guest that is active, as described above, is referred to herein as the current controlling VMCS. For example, while guest 250 is active, VMCS 251 is the current controlling VMCS. In an embodiment, the processing hardware may maintain a pointer to the current controlling VMCS in an internal register or other data structure.

If a VMCS is not a parent VMCS, its child pointer, such as child pointers 233, 253, and 263, may be a null pointer. If a VMCS does not have a parent, for example, if it is a root-mode VMCS, its parent pointer, such as parent pointer 222, may be a null pointer. Alternatively, these pointers may be omitted. In some embodiments, the "null" value for a null VMCS pointer may be zero. In other embodiments, other values may be interpreted as "null". For example, in one embodiment with 32-bit addresses, the value 0xffffffff may be interpreted as null.

Each guest's VMCS in FIG. 2 includes a number of bits for information related to interrupt processing, although fields or any other information storage space or format may be used instead of bits.

For example, interrupt control bits 234, 244, 254, and 264 are to indicate whether the corresponding guest's parent wants control of an interrupt (e.g., if set, an interrupt request causes a VM exit). Also, interrupt blocking bits 235, 245, 255, and 265 are to indicate whether interrupt requests that would otherwise cause a VM exit are to be blocked (e.g., if this bit and the corresponding interrupt control bit are set, the interrupt request is blocked; if this bit is cleared and the corresponding interrupt control bit is set, the interrupt request causes a VM exit; if the corresponding interrupt control bit is cleared, this bit is ignored). Interrupt acknowledge bits 236, 246, 256, and 266 are to indicate whether the guest is to acknowledge an interrupt request before a VM exit is performed in response to the interrupt request (e.g., if set, the guest acknowledges an interrupt request before the VM exit).

Additionally, virtual interrupt pending bits 237, 247, 257, and 267 are to indicate whether there is a virtual interrupt pending. A virtual interrupt is a request for a VM exit to occur when there is an open interrupt window. An open interrupt window is a period during which the processor is interruptible. For example, from a guest's perspective, an interrupt window may be open when an interrupt blocking control bit (e.g., EFLAGS.IF in the architecture of the Pentium® Processor Family) is cleared, interrupt blocking instructions (e.g., MOV SS, POP SS, and STI in the architecture of the Pentium® Processor Family) are not being executed, and the processor is not in an activity state that naturally blocks interrupts (e.g., wait-for-SIPI or shutdown in the architecture of the Pentium® Processor Family). Therefore, when a virtual interrupt bit is set, a VM exit will occur at the beginning of any instruction when there is an open interrupt window.

Other examples of open interrupt windows may be from a host's perspective and from a guest hierarchy perspective. From a host's perspective, whether an interrupt window is open may depend on the value of a control bit in a VMCS. For example, a host may have an open interrupt window when the interrupt acknowledge bit in its guest's VMCS is set, and/or the interrupt blocking bit is cleared. An embodiment of a determination of whether an interrupt window is open from a guest, hierarchy perspective in a layered virtualization architecture is described below with reference to FIG. 3.

Each guest's VMCS in FIG. 2 also includes an exit reason field 239, 249, 259, or 269 to indicate the cause of a VM exit. Upon a VM exit, these fields may be used to store any of a number of values that correspond to reasons that the VM exit occurred.

The foregoing descriptions are of particular bits and fields to illustrate one embodiment. In other embodiments, each VMCS may include any number of such bits or other spaces to correspond to any number of different types of interrupts or any number of control or other options.

Returning to FIG. 1, processor 120 includes control logic 121 to support virtualization, including interrupt processing in a layered virtualization architecture. Control logic 121 may be implemented in microcode, programmable logic, hard-coded logic, or any other form of control logic within processor 120. In other embodiments, control logic 121 may be implemented in any form of hardware, software, or firmware, such as a processor abstraction layer, within a processor or within any device accessible or medium readable by a processor, such as memory 130.

Control logic 121 includes VM entry logic 122, recognition logic 123, evaluation logic 124, window logic 125, and exit logic 126. VM entry logic 122 is to prepare for and cause a VM entry. Recognition logic 123 is to recognize virtual interrupt requests. Evaluation logic 124 is to determine whether to transfer control to a VMM in response to a virtual interrupt request. Window logic 125 is to determine whether an interrupt window (described above) is open. VM exit logic 126 is to prepare for and cause a VM exit. Each of these logic units may also perform additional functions, including those described as being performed by another of the logic units, and any or all of these logic units may be integrated into a single logic unit.

Control logic 121 causes processor 120 to execute method embodiments of the present invention, such as the method embodiment illustrated in FIG. 3, for example, by causing processor 120 to include the execution of one or more micro-operations, e.g., to support virtualization, in its response to virtualization instructions, other instructions from a host or guest, or virtualization events.

FIG. 3 illustrates method 300 for processing virtual interrupts according to an embodiment of the present invention. In box 310, a virtual interrupt pending indicator in the VMCS of an inactive guest is set, for example by an active host VMM. In box 312, a VM entry is performed to transfer control to that guest, and as a result, the guest becomes active. In box 314, recognition logic 123 recognizes the virtual interrupt request, for example, by reading the virtual interrupt pending indicator from the VMCS of the active guest.

In box 320, window logic 125 determines whether the interrupt window is open. In this embodiment, the interrupt window is open if either of two conditions is true. The first condition is that the lowest intervening monitor that has been designated to control interrupts, if any, has its interrupt acknowledge indicator set. The second condition is that there is no intervening monitor that has been designated to control interrupts, and the active guest has as open interrupt window. If the interrupt window is open, then, in box 325, a VM exit to the host VMM occurs. If the interrupt window is closed, then method 300 continues in box 330.

In one embodiment, the determination in box 320 may be performed as follows. First, the chain of child pointers from the VMCS of the host VMM to the VMCS of the active guest is followed to identify the lowest intervening VMM, if any, that has been designated to control interrupts. As each VMCS is the chain is identified, the interrupt control indicator in that VMCS is checked to determine if the monitor that controls that VMCS has been designated to control interrupts. If an intervening monitor is found that has been designated to control interrupts, then the interrupt acknowledge indicator in the VMCS that controls that monitor is checked. If that interrupt acknowledge indicator is set to indicate that interrupts are to be acknowledged on a VM exit, then the interrupt window is determined to be open. However, if the chain of child pointers is followed to VMCS of the active guest without finding an intervening monitor that has been designated to control interrupts, the determination of whether the interrupt window is open is based on the whether the interrupt window of the active guest is open, according to any known approach, such as example of a guest's perspective described above.

In box 330, evaluation logic 124 determines whether there is to be a VM exit to an intervening monitor. In this embodiment, if, for the lowest intervening monitor that has been designated to control interrupts, if any, the interrupt acknowledge indicator in the VMCS that control that monitor indicates that interrupts are not to be acknowledged on a VM exit, then the result of the determination is that there is to be a VM exit to that monitor. The determination may be performed as described above with respect to box 320, i.e., by following the chain of child pointers to find the lowest intervening monitor that has been designated to control interrupts, and checking the interrupt acknowledge indicator in the VMCS that controls that monitor. If is it determined that there is to be a VM exit to an intervening monitor, then, in box 335, a VM exit occurs to that monitor. If, however, no intervening monitor is found that has been designated to control interrupts, then method 300 continues in box 340.

In box 340, the active guest continues to execute until there is change in the status of the interrupt window, e.g., until the interrupt window opens.

Within the scope of the present invention, the method illustrated in FIG. 3 may be performed in a different order, performed with illustrated boxes omitted, performed with additional boxes added, or performed with a combination of reordered, omitted, or additional boxes.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 120, or any other component or portion of a component, designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for processing virtual interrupts in a layered virtualization architecture have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the an upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor that processes virtual interrupts in a layered virtualization architecture with one or more intervening monitors, comprising:
   virtual machine entry control hardware to transfer control of the processor from a host to a guest;
   recognition control hardware to recognize a virtual interrupt request;
   window control hardware to determine whether an interrupt window is open based on whether an interrupt blocking control bit in the processor is cleared, whether an interrupt blocking instruction is being executed by the processor, and whether the processor is in an activity state that blocks interrupts;
   evaluation control hardware to determine, based on the determination of the window control hardware, whether to transfer control of the processor from the guest to a lowest intervening monitor of the layered virtualization architecture in response to the virtual interrupt request, wherein the lowest intervening monitor is found by following a chain of child pointers; and
   virtual machine exit control hardware to transfer control of the processor to the lowest intervening monitor in response to the evaluation control hardware determining to transfer control and that the interrupt window is open.

2. The processor of claim 1, wherein the evaluation control hardware is also to determine to transfer control to the lowest intervening monitor based on a first indicator in a virtual machine control structure.

3. The processor of claim 2, wherein the first indicator is to indicate whether the lowest intervening monitor is designated to control interrupts.

4. The processor of claim 3, wherein the evaluation control hardware is also to determine to transfer control to the lowest intervening monitor based on a second indicator in the virtual machine control structure.

5. The apparatus of claim 4, wherein the second indicator is to indicate whether interrupts are to be acknowledged.

6. A method for processing virtual interrupts in a layered virtualization architecture with one or more intervening monitors, comprising:
   transferring control of a processor from a host to a guest;
   recognizing a virtual interrupt request;
   determining whether an interrupt window is open based on whether an interrupt blocking control bit in the processor is cleared, whether an interrupt blocking instruction is being executed by the processor, and whether the processor is in an activity state that blocks interrupts;

finding a lowest intervening monitor of the layered virtualization architecture by following a chain of child pointers;

determining whether to transfer control to the lowest intervening monitor in response to the virtual interrupt request, and transferring control to the lowest intervening monitor if the interrupt window is open.

7. The method of claim 6, wherein determining whether to transfer control includes checking a first indicator in a virtual machine control structure.

8. The method of claim 7, wherein the first indicator is to indicate whether the intervening monitor is designated to control interrupts.

9. The method of claim 8, wherein determining whether to transfer control also includes checking a second indicator in the virtual machine control structure.

10. The method of claim 9, wherein the second indicator is to indicate whether interrupts are to be acknowledged.

11. A system for processing virtual interrupts in a layered virtualization architecture with one or more intervening monitors, comprising:

a memory to store a control structure for a virtual machine; and a processor including:

virtual machine entry logic to transfer control of the processor from a host to a guest to execute in the virtual machine;

recognition logic to recognize a virtual interrupt request;

window logic to determine whether an interrupt window is open based on whether an interrupt blocking control bit in the processor is cleared, whether an interrupt blocking instruction is being executed by the processor, and whether the processor is in an activity state that blocks interrupts;

evaluation logic to determine, based on the determination of the window logic, whether to transfer control of the processor from the guest to a lowest intervening monitor of the layered virtualization architecture in response to the virtual interrupt request, wherein the lowest intervening monitor is found by following a chain of child pointers; and virtual machine exit logic to transfer control to the lowest intervening monitor in response to the evaluation logic determining that the interrupt window is open.

12. The system of claim 11, wherein the evaluation logic is to determine whether to transfer control based on an indicator in the virtual machine control structure.

13. The system of claim 12, wherein the indicator is to indicate whether the lowest intervening monitor is designated to control interrupts.

14. The system of claim 11, wherein the memory is dynamic random access memory.

\* \* \* \* \*